W. M. SMITH.
NUT LOCK.
APPLICATION FILED FEB. 20, 1909.
930,806.
Patented Aug. 10, 1909.
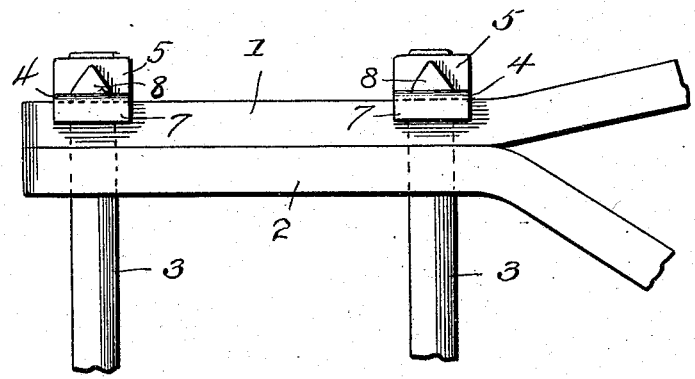
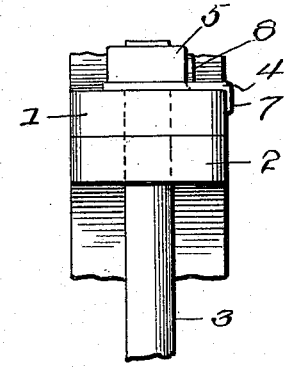
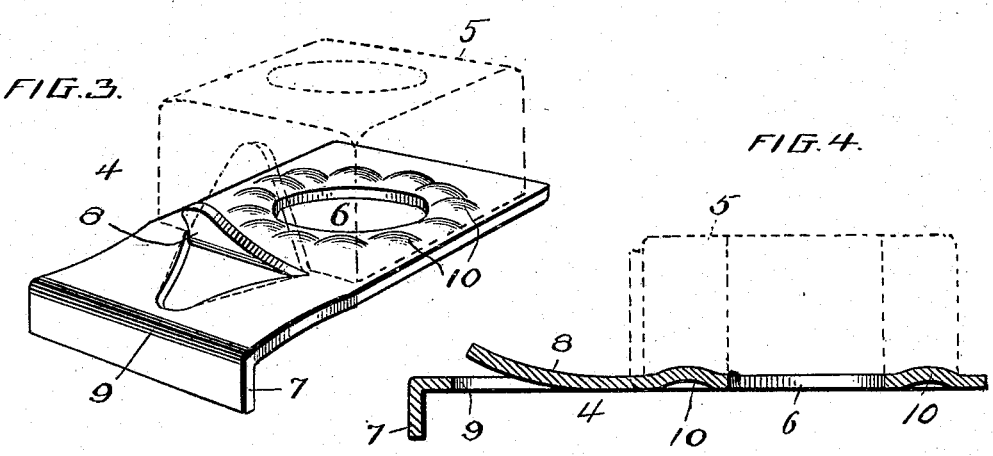
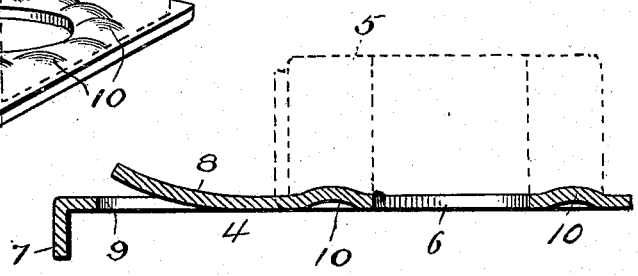
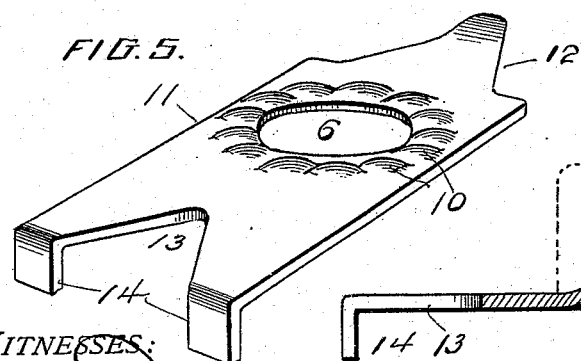
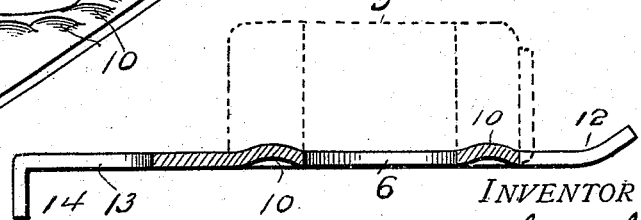
WITNESSES:
INVENTOR
William M Smith
BY
A. M. Wilson
Attorney

UNITED STATES PATENT OFFICE.

WILLIAM M. SMITH, OF TURTLE CREEK, PENNSYLVANIA.

NUT-LOCK.

No. 930,806.　　　　Specification of Letters Patent.　　　Patented Aug. 10, 1909.

Application filed February 20, 1909. Serial No. 479,163.

*To all whom it may concern:*

Be it known that I, WILLIAM M. SMITH, a citizen of the United States, residing at Turtle Creek, in the county of Allegheny and State of Pennsylvania, have invented certain new and useful Improvements in Nut-Locks, of which the following is a specification.

This invention relates to nut locks particularly adapted for use in connection with arch bars, and although a nut lock in accordance with this invention is designed primarily for use in connection with arch bars, yet it is to be understood that the nut lock is adapted for any purposes wherein it is found applicable.

One of the objects of the invention is to provide in a nut lock, a washer having as a part thereof a compressible means whereby after the nut has been tightened, the nut can be given an additional turn if desired without causing damage to or the stripping of the threads of the nut.

A further object of the invention is to provide in a nut lock, a washer having as a part thereof a locking wing adapted to engage one of the sides of the nut to prevent the turning of the nut and to further provide the washer with a compressible means which can be compressed after the nut has been tightened, so as to allow of the nut being given an additional turn or a further turn so that one of the sides of the nut will be so positioned as to be arranged opposite the inner face of the locking wing, the locking wing when opposite the nut being angularly disposed with respect to the body of the washer. Owing to the provision of the compressible means, a further turn to position the nut in operative relation with respect to the wing can be had without any damage to or the stripping of the threads of the nut.

Further objects of the invention are to provide a nut lock which shall be simple in its construction, strong, efficient in its use, forming a positive lock, readily set up and inexpensive to manufacture.

With the foregoing and other objects in view, the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings wherein like reference characters denote corresponding parts throughout the several views, Figure 1 is a top plan of a pair of arch bars showing the adaptation therewith of a nut lock in accordance with this invention. Fig. 2 is an end view of a pair of arch bars showing the adaptation therewith of a nut lock in accordance with this invention. Fig. 3 is a perspective view of the locking washer, one of the elements of the nut lock, and also showing in dotted lines the nut. Fig. 4 is a longitudinal sectional view of the locking washer also showing the nut in dotted lines. Fig. 5 is a perspective view of a modified form of locking washer, and Fig. 6 is a longitudinal sectional view of the form of locking washer shown in Fig. 5 also illustrating the nut in dotted lines as well as the locking wing also in dotted lines.

Referring to the drawings by reference characters, 1 and 2 denote a pair of arch bars which are connected together by a nut lock in accordance with this invention, the lock comprising a bolt 3, a locking washer 4 and a nut 5.

The locking washer as shown in Fig. 3 will be referred to generally by the reference character 4 and is formed from a rectangular strip of metallic material having the opening 6 at one side of the center and further having one end bent at right angles to form a flange as at 7 which constitutes a means to prevent shifting of the washer 4 when mounted upon the arch bars as shown in Figs. 1 and 2. The locking washer 4 further comprises a wing 8 which is V-shaped in contour and which is struck from the strip of material, the wing 8 when in its operative position is adapted to extend at right angles with respect to the body of the washer and engage one side of the nut as clearly shown in Figs. 1 and 2 and also shown in dotted lines in Fig. 3. By striking the wing 8 from the body of the washer an opening 9 is provided, said opening after the wing 8 has been formed is contracted or rather has its width reduced so as to prevent the wing 8 from again entering the opening and further causing the wing, if it is in a lowered position, to seat on the body portion of the washer above the edge of the opening which enables an operator to conveniently position the wing against the nut, if occasion so requires. If the opening 9 were not reduced, there would be a possible chance when the wing 8 is lowered, of its entering the opening and would require considerable trouble and inconvenience as well as a loss of time for the workman to elevate the wing to its angular or locking position with respect to the side of the nut. Surrounding the opening 6 is a circular series of rounded protuberances 10—that is to say, rounded in sections, the one at right angles to the other, these protuberances are struck from the washer and project from the outer face thereof, are arranged in close proximity to the edge of the opening of the washer as well as arranged in close proximity to each other or independent of each other and entirely surround the edge of the opening of the washer and the said row of protuberances form what is termed a compressible means, for the reason that when the nut 5 is screwed home, the protuberances 10 can be depressed by the nut if a further turn is had. The function of the protuberances 10 is to provide means to allow of a further shifting of the nut so that one side of the nut can extend transversely with respect to the washer 5 and such action can be had without causing any damage to or stripping of the threads of the nut. In this connection, it will be stated that when the nut has been screwed home so that the inner face thereof will engage the protuberances 10, there is a possibility that the sides of the nut will be angularly disposed with respect to the upper face of the washer and under such conditions to have a side extend transversely with respect to the upper face of the washer so that the said side can be engaged by the locking wing, it would necessitate the screwing back of the nut, but as the protuberances 10 are compressible, the nut can be given an additional turn forward until one side of the nut extends transversely with respect to the upper face of the washer and the locking wing can then be bent up to engage the said side.

In the modification shown in Figs. 5 and 6, the locking washer which is referred to generally by the reference character 11 is provided at one end with the locking wing 12, said wing being curvilinear in contour. The other end of the washer 11 is cut away as at 13 and bent at an angle as at 14 to provide a pair of stop flanges. Otherwise than that as stated, the construction of the washer shown in Figs. 5 and 6 is the same as that shown in Fig. 3. The washer shown in Fig. 5 is struck from a strip of material and consequently the opening 13 is formed by striking from the strip, the wing 12 for the other washer. The form of washer shown in Figs. 5 and 6 operates in the same manner as that disclosed in Fig. 3.

The wings 8 and 12 when bent to extend at right angles with respect to the body of the washers and so as to engage one side of the nut will prevent the nut from turning, consequently from screwing off backward and breaking the joint.

What I claim is:

1. A nut lock embodying a rectangular washer having its opening at one side of its center and further having a portion thereof at the opposite side of its center constituting a locking wing adapted to extend in parallelism with respect to a side of a nut to lock the nut from turning and further having a plurality of protuberances rounded in sections, the one at right angles to the other, said protuberances constituting a compressible means adapted to be compressed when a nut is screwed home for the positioning of one side of the nut opposite the inner face of said locking wing without damage to the threads of the nut.

2. A nut lock embodying a rectangular washer having its opening at one side of its center and further having a portion thereof at the opposite side of its center constituting a locking wing adapted to extend in parallelism with respect to a side of a nut to lock the nut from turning and further having a part thereof constituting a compressible means adapted to be compressed when a nut is screwed home for the positioning of one side of the nut opposite the inner face of said locking wing without damage to the threads of the nut, said wing struck from said washer and the opening formed by the wing contracted to prevent the entrance of the wing in the opening.

3. A nut lock embodying a rectangular washer having its opening at one side of its center and further having a portion thereof at the opposite side of its center constituting a locking wing adapted to extend in parallelism with respect to a side of a nut to lock the nut from turning and further having a part thereof constituting a compressible means adapted to be compressed when a nut is screwed home for the positioning of one side of the nut opposite the inner face of said locking wing without damage to the threads of the nut, said wing struck from said washer and the opening formed by the wing contracted to prevent the entrance of the wing in the opening, said washer further provided with an angularly disposed stop flange at one end thereof.

4. A nut lock embodying a washer having a portion thereof constituting a locking wing adapted to extend in parallelism with respect to the side of a nut to lock the nut from turning and further provided on one face in proximity to the edge of the opening of the washer with a plurality of protuberances rounded in sections, the one at right angles to the other, said protuberances constituting a compressible means adapted to be compressed when the nut is screwed home to enable the positioning of one side of the nut opposite the inner face of said locking wing without damage to the threads of the nut, each of said protuberances independent of the other and arranged in close proximity with respect to each other.

5. A nut lock embodying a washer having a portion thereof constituting a locking wing adapted to extend in parallelism with respect to the side of a nut to lock the nut from turning and further provided on one face in proximity to the edge of the opening of the washer with a plurality of protuberances rounded in sections, the one at right angles to the other, said protuberances constituting a compressible means adapted to be compressed when the nut is screwed home to enable the positioning of one side of the nut opposite the inner face of said locking wing without damage to the threads of the nut, each of said protuberances independent of the other and arranged in close proximity with respect to each other, said washer further provided at one end with a stop flange.

6. A nut lock embodying a washer having a portion thereof constituting a locking wing adapted to extend in parallelism with respect to the side of a nut to lock the nut from turning and further provided on one face in proximity to the opening of the washer with a plurality of protuberances rounded in sections, the one at right angles to the other, said protuberances constituting a compressible means adapted to be compressed when the nut is screwed home to enable the positioning of one side of the nut opposite to the inner face of said locking wing without damage to the threads of the nut, said protuberances surrounding the edge of the opening of the washer and each independent of the other and arranged in close proximity with respect to each other, said washer further provided at one end with a stop flange.

7. A nut lock embodying a rectangular washer having its opening at one side of its center and further having a portion thereof constituting a locking wing adapted to extend in parallelism with respect to a side of a nut to lock the nut from turning and further having in close proximity to the edge of the opening of the washer a circular row of protuberances constituting a compressible means adapted to be compressed when a nut is screwed home for the positioning of one side of the nut opposite the inner face of said locking wing without damage to the threads of the nut, said wing when in normal position extending longitudinally of the washer, said protuberances concavo-convex in horizontal and longitudinal section.

8. A nut lock embodying a rectangular washer having its opening at one side of its center and further having a portion thereof constituting a locking wing adapted to extend in parallelism with respect to a side of a nut to lock the nut from turning and further having in close proximity to the edge of the opening of the washer a circular row of protuberances constituting a compressible means adapted to be compressed when a nut is screwed home for the positioning of one side of the nut opposite the inner face of said locking wing without damage to the threads of the nut said wing when in normal position extending longitudinally of the washer, said washer further provided with an angularly disposed stop flange at one end thereof, said protuberances concavo-convex in horizontal and longitudinal section.

In testimony whereof I affix my signature, in presence of two witnesses.

WILLIAM M. SMITH.

Witnesses:
N. LOUIS BOGAN,
R. M. PARKER.